Dec. 5, 1944. J. M. KISSELLE ET AL 2,364,078
CIGARETTE TRAY
Filed Sept. 18, 1941 4 Sheets-Sheet 2
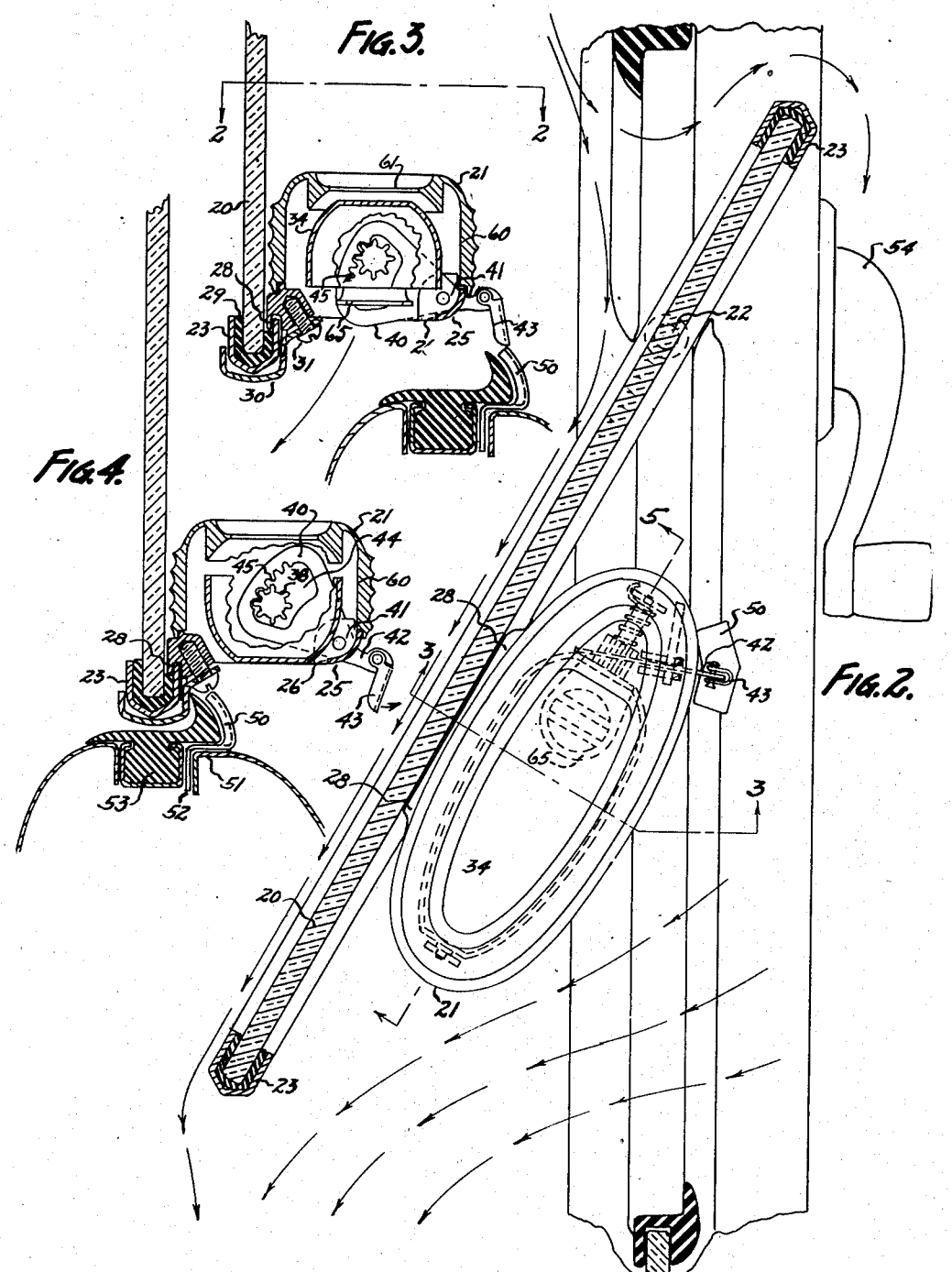
INVENTORS
John M. Kisselle
Charles E. McCormick
By Barnes, Kisselle, Laughlin & Reusch
Attorneys Dec. 5, 1944.   J. M. KISSELLE ET AL   2,364,078
CIGARETTE TRAY
Filed Sept. 18, 1941   4 Sheets-Sheet 3

INVENTORS
John M. Kisselle
Charles E. McCormick
By Barnes, Kisselle, Laughlin & Raisch
Attorneys Dec. 5, 1944.                J. M. KISSELLE ET AL                2,364,078
                                  CIGARETTE TRAY
                          Filed Sept. 18, 1941          4 Sheets-Sheet 4

INVENTORS
John M. Kisselle
Charles E. McCormick
By Barnes, Kisselle, Laughlin & Rauch
Attorneys Patented Dec. 5, 1944

2,364,078

UNITED STATES PATENT OFFICE 2,364,078

CIGARETTE TRAY

John M. Kisselle, Detroit, and Charles E. McCormick, Dearborn, Mich.

Application September 18, 1941, Serial No. 411,437

9 Claims. (Cl. 206—19.5)

This invention relates to a cigarette tray and has particularly to do with a tray to be used on a moving vehicle.

It is an object of the present invention to provide an ash tray which may be used in combination with the "no-draft" ventilation window common on vehicles today. This "no-draft" ventilation window is the type which is pivoted on a substantially vertical axis so that the rear portion may be swung outwardly and the front portion swung inwardly. The ventilating feature of this window resides in the fact that the air enters the aperture formed at the forward end thereof and passes out the aperture formed at the rear end thereof when opened.

Another object of the present invention is to provide an ash tray which may be utilized in connection with a "no-draft" window whereby the ventilating features of the window can be used to advantage in removing ashes from the tray and the vehicle.

It is a further object of the invention to provide an ash tray which is automatically dumped upon opening of the window and yet which may be manually dumped at any time when the window is open.

It is a further object of the invention to provide an ash tray which may be adapted to present-day window construction or an ash tray which may be specially constructed in connection with the window to serve as an original fitting.

Other objects and features of the invention, having to do with details of construction and operation, will be set forth in the following description and claims.

In the drawings:

Fig. 2 is a horizontal section through the ventilator window (lines 2—2 of Fig. 3) showing the relative position of the ash tray.

Fig. 3 is a sectional view on lines 3—3 of Fig. 2.

Fig. 4 is a sectional view similar to Fig. 3 showing the window in closed position.

Figure 1:
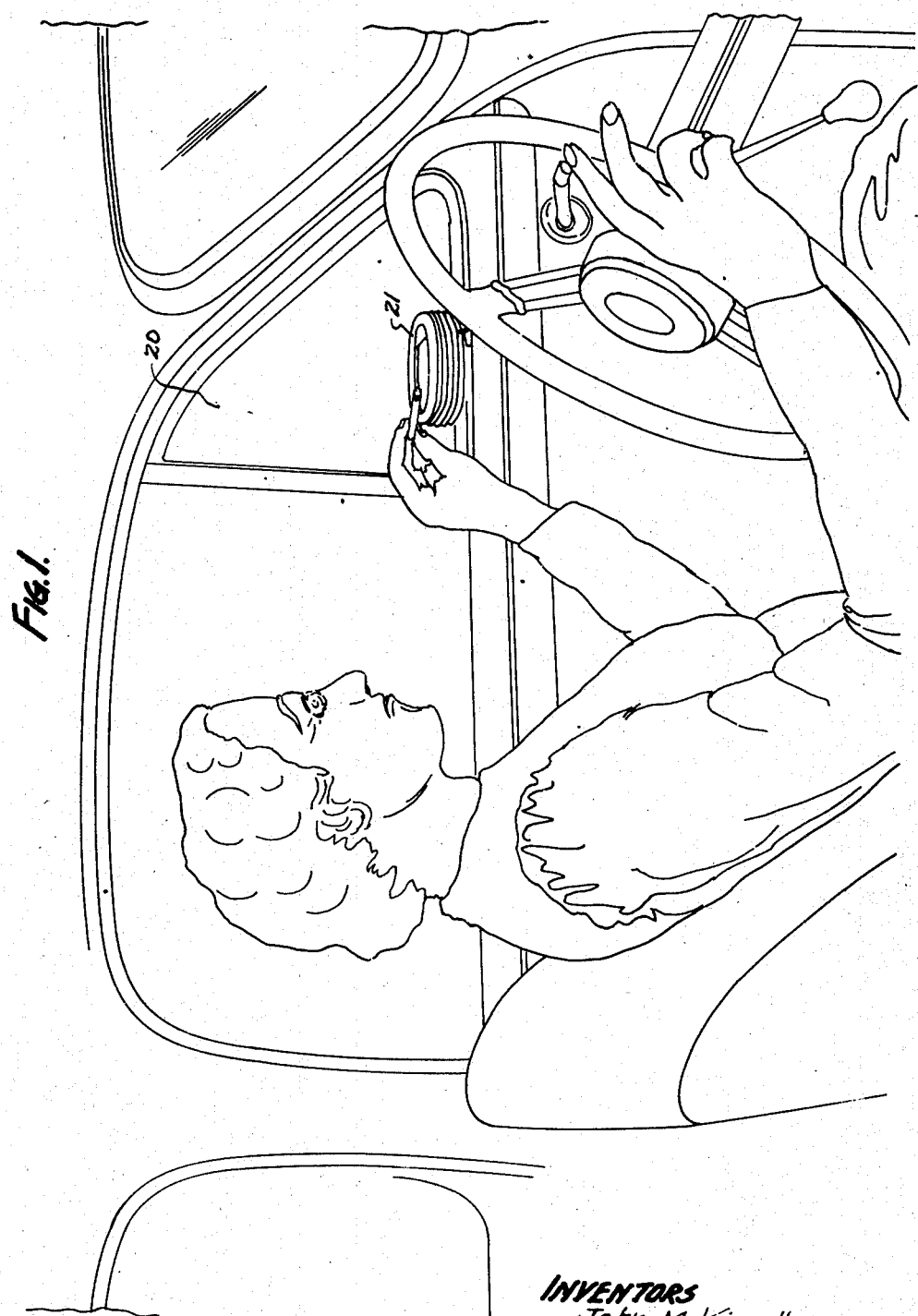
Fig. 1 shows the interior of a vehicle and illustrates the use of the tray by an occupant of the vehicle.

In Fig. 1 a "no-draft" ventilation window is shown at 20 and an ash tray of the type to be described is shown at 21. In Fig. 2, the window 20 is shown having a pivot point 22. When the window is open the portion behind the pivot point is moved outwardly from the vehicle. The window panel 20 is surrounded by a decorative frame 23.

Figure 5:
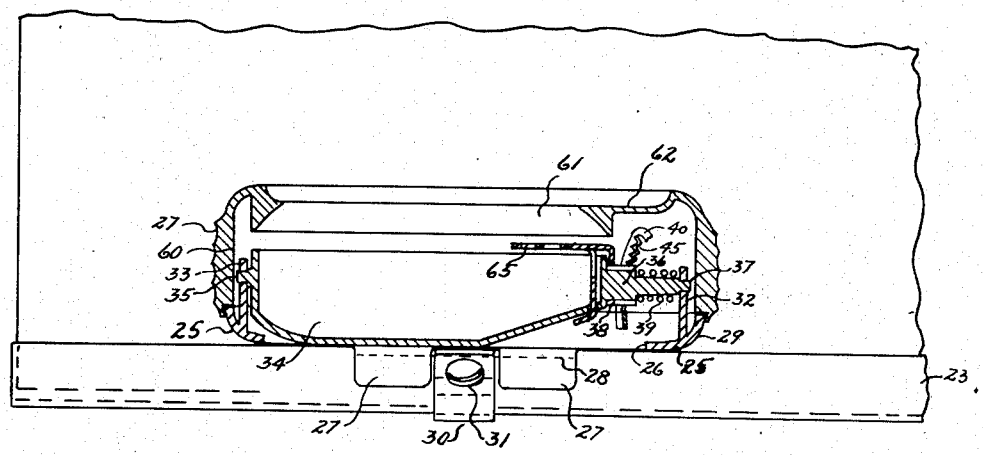
Fig. 5 is a longitudinal section taken on the lines 5—5 of Fig. 2.

This frame 23 at its lower edge serves as a support for the ash tray 21. Referring to Fig. 5, the ash tray 21 consists of a base 25 which consists of an oval shaped ring having an elongated central opening 26. At one side of the base 25 and extending downwardly are two relatively thin plates 27 and spaced outwardly from these plates is a longitudinally extending flange 28 (also shown in Fig. 3), which engages over the edge of frame 23. Referring to Fig. 3, the decorative frame member 23 surrounding the window panel has a U-shaped cross section and between the frame and the window is a U-shaped rubber lining member 29. The flange 28 is arranged to lie between the glass pane 20 and the inside edge of frame 23, as shown in Figs. 3 and 4. The plates 27 spaced from the flange 28 lie on the outside of the frame member on the inside surface of the window. This supports the base member 25 which is then locked in place by a member 30 which fits around the outside of the frame member 23 and has a portion screwed to the base by a bolt 31. The base is thus locked in position.

Referring again to Fig. 5, at each end of the base are, respectively, upstanding lugs 32 and 33, each having a hole which serves as a bearing mounting for an ash receptacle 34. At the left end of the receptacle a stud 35 projects into a hole in lug 33. At the right end of the receptacle a relatively long projection 36 has a small end 37 adapted to be received by the hole in lug 32. The portion of the projection 36 adjacent the receptacle is formed as a gear 38. The remainder of the projection 36 is surrounded by a coil spring 39 with one end fastened on lug 32 and the other end on the receptacle and wound in such a manner that the spring urges and holds the receptacle in its upright position, as shown in Fig. 5. It will be seen that the receptacle 34 is arranged to be pivoted about the axis passing through the projections 35 and 37. This pivoting is accomplished by a triangular member 40 pivoted at 41 (Fig. 4) at one corner of the base 25. A portion 42 of the triangular member 40 projects through the base and this portion supports a swinging dog 43. The large portion of the triangular member 40 is provided with an opening 44, the top edge of which is formed as a segment of an internal gear 45. This gear 45 engages the gear formation 38, which is an integral part of the revolving ash receptacle 34.

The swinging dog 43 is arranged to exert force in the direction of the arrow in Fig. 4 on the triangular member 40. Force thus exerted will pivot the member 40 and rotate gear 38 and the receptacle 34 to an upside down position, as shown in Fig. 3.

Normally the tilting force, above described, may be applied by the use of a cam 50 mounted on a stationary frame 51 of the vehicle body. This cam has an L-shaped portion 52 which is arranged to fit down under the rubber sealing member 53 and be held in place by said member and by other structural members of the body. When the window 20 is moved outwardly either by a handle 54 as in some automobile models, or manually as in other models, the dog 43 will contact cam 50 and an upward force will then be applied on arm 42 of member 40, thereby causing the tilting and dumping movement of the receptacle 34, as above described. Any material in the receptacle, including cigarette ashes and stubs, will then be dumped outside of the vehicle through the opening 26 in the base 25. This dumping position is shown in Fig. 3. After dog 43 has passed over the cam 50, the spring 39 will return the receptacle to the upright position, as shown in Fig. 4.

A decorative and protective housing 60, having an oval shape in plan view, is fitted onto the base 25. The top of this housing 60 is provided with an oval opening 61 slightly narrower than the top opening of the receptacle 34 to insure that the ashes directed toward the tray will be received by the repectacle. The operating mechanism of the receptacle is covered by a flat surface 62 (Fig. 5). Within the receptacle 34 is a snuffer 65 suitably mounted on the receptacle.

The air flow around the "no-draft" window is illustrated by flow arrows in Fig. 2. When the window is open, air enters the front opening and leaves the rear opening. Air passing around along the outside of the window toward the rear also draws air from the rear opening and any ashes that are dumped when the window is open will be dumped from the window and away from the vehicle. When the "no-draft" window is open, the ash receptacle may be dumped manually by exerting a force in the direction of the arrow on dog 43.

Figure 6:
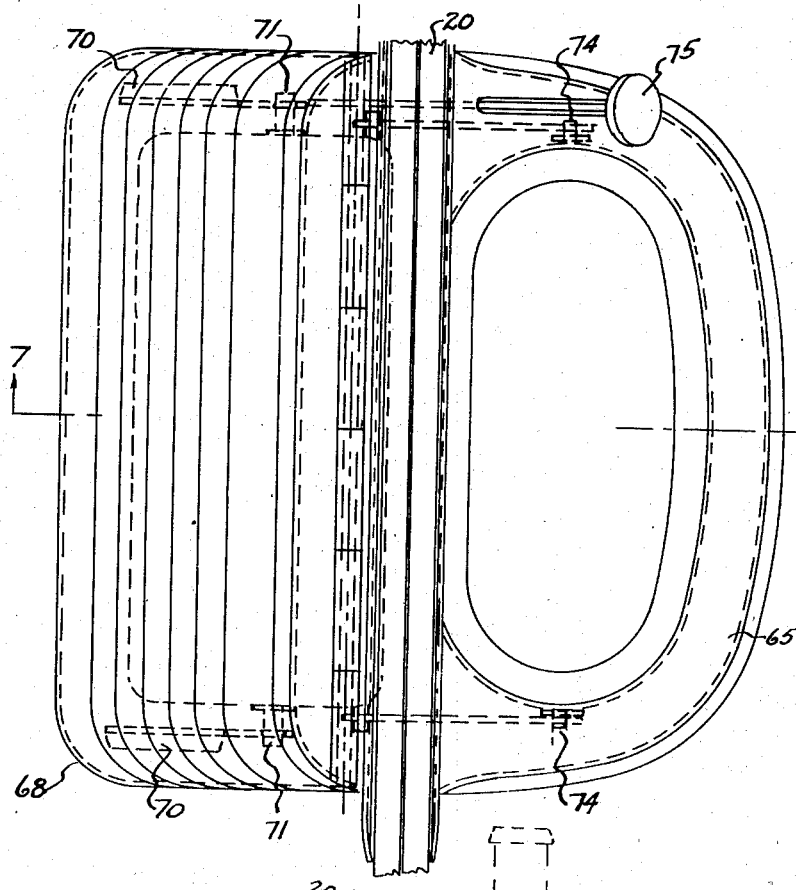
Fig. 6 is a modified form of ash tray adapted to be inserted in an opening formed in the "no-draft" ventilator window.
Figure 7:
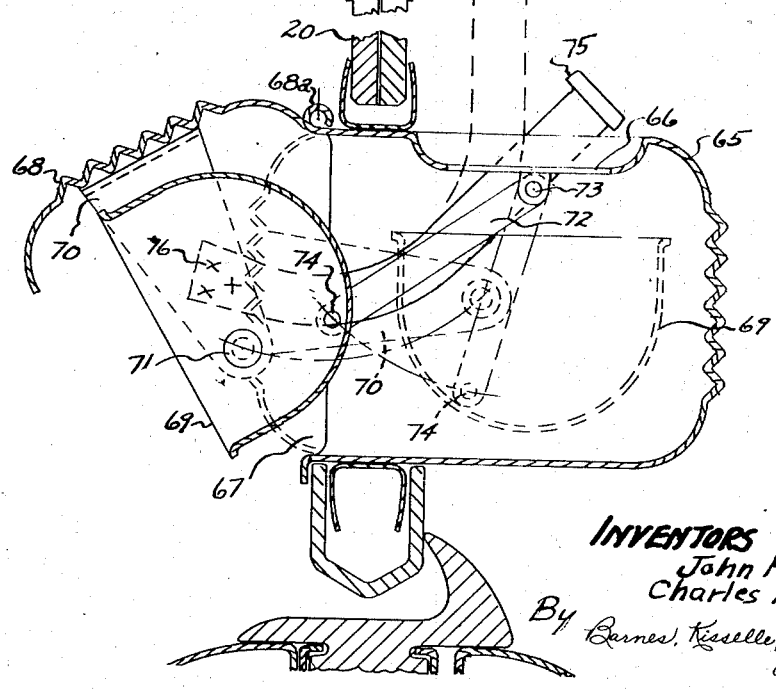
Fig. 7 is a transverse section taken on lines 7—7 of Fig. 6.

A modified form of the invention is illustrated in Figs. 6 and 7. In this form of the invention the ash tray may be mounted at substantially the same point on the "no-draft" window shown in Fig. 1, but a hole or opening is made in the glass so that the housing of the ash tray extends through the opening to the outside of the car. The elongated housing 65 is shaped with an oval opening 66 at the top and an opening 67 at the outside. This opening 67 is to be closed by a flap or door 68 hinged at its top edge 68a. A tray 69 is mounted on the housing and on the door as follows: The door has inward extensions 70 to which the tray is pivoted at 71. These extensions are at each end of the door. Links 72 are pivoted at 73 at each end of the housing and pivoted at 74 at each end of the tray. There is, therefore, a two-point suspension for each end of the tray 69. A push lever 75 is spot-welded at 76 to one of the extensions 70 and extends upwardly through a slot at one end of the housing. When force is applied to this lever the door 68 is forced open and since the pivotal points 71 are moved, the tray or receptacle 69 will shift to a dumping position, as shown in Figs. 6 and 7. Suitable means, including the weight of the door 68 can be provided to return the parts to their resting position shown in dotted lines in Fig. 7.

It will be seen that the tray 69 can be dumped when the window panel 20 is either opened or closed. If dumped when the window is closed, the air passing the car will carry the ashes away. If dumped when open, the air on the outside of the window in combination with the air passing out of the rear opening of the window, will carry the ashes downward and away from the car.

What we claim is:

1. In a vehicle, a "no-draft" ventilator window of the type pivoted between its ends, having a portion which moves out from the body of the car when the window is open, and an ash receiving and dumping mechanism comprising an elongated housing mounted along the outwardly moving portion of said window, and means movably mounted on said housing adapted to retain ashes within said housing in one position and movable to dump ashes from said housing, and cooperating means operatively associated with said movably mounted means and a member fixed to said vehicle adjacent the opening of said window, and adapted to operate in response to the opening of said window to shift the movably mounted means to dump position.

2. In a vehicle, a "no-draft" ventilator window of the type pivoted between its ends, having a portion which moves out from the body of the car when the window is open, and an ash receiving and dumping mechanism comprising an elongated housing mounted along the outwardly moving portion of said window, means movably mounted on said housing adapted to retain ashes within said housing in one position and movable to dump ashes from said housing, and means operatively connected with said first named means and a means affixed to the vehicle adjacent the window opening and adapted to operate in response to opening of said window to cause ashes within said housing to be dumped.

3. In a vehicle, a "no-draft" ventilator window of the type pivoted between its ends, having a portion which moves out from the body of the car when the window is open, and an ash receiving and dumping mechanism comprising an elongated base mounted along the outwardly moving portion of said window, an ash receptacle mounted on said base and movable about a longitudinal axis from a receiving position to a dumping position, and cooperating means operatively associated with said receptacle and a member fixed to said vehicle adjacent the opening of said window, and adapted to operate in response to the opening of said window to shift said receptacle from an ash receiving to an ash dumping position.

4. In a vehicle, a "no-draft" ventilator window of the type pivoted between its ends, having a portion which moves out from the body of the car when the window is open, and an ash receiving and dumping mechanism comprising an elongated base mounted along the outwardly moving portion of said window, an ash receptacle mounted on said base and movable from a receiving position to a dumping position, and cooperating means operatively associated with said receptacle and a member fixed to said vehicle adjacent the opening of said window, and adapted to operate in response to the opening of said window to shift said receptacle from an ash receiving to an ash dumping position.

5. In a vehicle, a "no-draft" ventilator window of the type pivoted between its ends, having a portion which moves out from the body of the car when the window is open, an ash receiving and dumping mechanism comprising an elongated base mounted along the outwardly moving portion of said window, an ash receptacle mounted on said base and movable from a receiving position to a dumping position, a gear means on the axis of movement of said receptacle, means pivoted on said base and having a portion engageable with said gear means and a portion projecting from said base, and means on said vehicle adjacent the opening of said ventilator window for contacting said outward extending portion to shift said means and cause movement of said receptacle from ash receiving to ash dumping position.

6. In a vehicle, a "no-draft" ventilator window of the type pivoted between its ends and having a metal frame around its outer edge, said frame having a U-shaped cross section separated from the window panel by a U-shaped rubber lining, and an ash tray to be mounted on said window comprising a housing having a flange portion adapted to hook over one side of said window frame into the space normally occupied by the rubber lining and a portion to lie flush against the surface of that portion of the frame which is contacted by the flange, and means passing around said window frame from the outside thereof and fastened to the housing to lock the housing in position.

7. A cigarette and ash ejector device to be used with a movable panel located in an opening comprising a mounting means on said panel, a tray movably mounted on said mounting means, trip means connected to said tray and positioned to engage a margin of said opening upon movement of the panel, and resilient means for urging said last named means to a trip position, said means cooperating in such manner that a moving of said panel relative to said opening will cause said tray to pass through said opening and dump its contents.

8. A cigarette and ash ejector device to be used with a movable panel located in an opening and having a portion moving outward through said opening, comprising a mounting means on the portion of said panel which moves outward, a tray movably mounted on said mounting means, trip means connected to said tray and positioned to engage a margin of said opening upon movement of the panel, and resilient means for urging said last named means to trip position, all of said means cooperating in such manner that a movement of said panel relative to said opening will cause said tray to pass through said opening and dump its contents.

9. A cigarette and ash ejector device to be used with a movable panel located in an opening and having a portion moving outward through said opening, comprising a mounting means on the portion of said panel which moves outward, an ash retaining member movably mounted on said mounting means and trip means connected to said member and positioned to engage a margin of said opening to cause movement of said member to a dumping position as the panel moves outwardly from the opening.

JOHN M. KISSELLE.
CHARLES E. McCORMICK.